United States Patent
Raja et al.

(10) Patent No.: US 11,392,378 B2
(45) Date of Patent: Jul. 19, 2022

(54) EXECUTING A SET OF LOAD OPERATIONS FOR A GATHER-LOAD INSTRUCTION AND CONTROLLING HANDLING OF ANOTHER INSTRUCTION THAT DEPENDS ON COMPLETION OF THE GATHER-LOAD INSTRUCTION

(71) Applicant: Arm Limited, Cambridge (GB)

(72) Inventors: Abhishek Raja, Austin, TX (US); Michael Filippo, Austin, TX (US); Huzefa Moiz Sanjeliwala, Austin, TX (US); Kelvin Domnic Goveas, Austin, TX (US)

(73) Assignee: Arm Limited, Cambridge (GB)

( * ) Notice: Subject to any disclaimer, the term of this patent is extended or adjusted under 35 U.S.C. 154(b) by 221 days.

(21) Appl. No.: 16/521,748

(22) Filed: Jul. 25, 2019

(65) Prior Publication Data
US 2021/0026627 A1    Jan. 28, 2021

(51) Int. Cl.
*G06F 9/30* (2018.01)
*G06F 9/38* (2018.01)
*G06F 9/48* (2006.01)

(52) U.S. Cl.
CPC ...... *G06F 9/30036* (2013.01); *G06F 9/30043* (2013.01); *G06F 9/30101* (2013.01); *G06F 9/30196* (2013.01); *G06F 9/3842* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 2011/0078697 A1* | 3/2011 | Smittle | G06F 9/384 718/104 |
| 2012/0060015 A1* | 3/2012 | Eichenberger | G06F 9/30036 712/4 |

(Continued)

*Primary Examiner* — John M Lindlof
(74) *Attorney, Agent, or Firm* — Nixon & Vanderhye P.C.

(57) ABSTRACT

Circuitry comprises an instruction decoder to decode a gather load instruction having a vector operand comprising a plurality of vector entries, in which each vector entry defines, at least in part, a respective address from which data is to be loaded; the instruction decoder being configured to generate a set of load operations relating to respective individual addresses in dependence upon the vector operand, each of the set of load operations having a respective identifier which is unique with respect to other load operations in the set, and control circuitry to maintain a data item for the gather load instruction, the data item including a count value representing a number of load operations in the set of load operations awaiting issue for execution; and execution circuitry to execute the set of load operations; the control circuitry being configured, in response to a detection from the count value of the data item associated with a given gather load instruction that the set of load operations generated for the given gather load instruction has reached a predetermined stage relative to execution of all of that set of load operations, to control handling of a consumer instruction, being an instruction which depends upon the completion of the given gather load instruction.

17 Claims, 9 Drawing Sheets

(56) References Cited

U.S. PATENT DOCUMENTS

| | | | |
|---|---|---|---|
| 2014/0189322 A1* | 7/2014 | Ould-Ahmed-Vall | ........................ G06F 11/3466 712/223 |
| 2015/0277916 A1* | 10/2015 | Khartikov | ............. G06F 9/3855 712/205 |
| 2020/0004550 A1* | 1/2020 | Thakker | ................ G06F 9/3832 |

* cited by examiner

|  | 700 | 710 |
|---|---|---|
| 720 Valid | | |
| 730 Count | | |
| 740 PTAG | | |
| 750 Instr ID | | |

EXECUTING A SET OF LOAD OPERATIONS FOR A GATHER-LOAD INSTRUCTION AND CONTROLLING HANDLING OF ANOTHER INSTRUCTION THAT DEPENDS ON COMPLETION OF THE GATHER-LOAD INSTRUCTION

BACKGROUND

The present technique relates circuitry and methods.

A data processing apparatus, such as a microprocessor, may have a processing pipeline for performing data processing operations in response to micro-operations generated based on decoding of instructions. Some instructions may be decoded into a single micro-operation, while other instructions may be split or "cracked" into multiple separate micro-operations which can then separately be scheduled by the pipeline for execution.

In the example case of, for example, gather loads (in which a vector and a scalar operand, or indeed a pair of vector operands, together can define a set of potentially disparate addresses from which data values are loaded to populate a destination vector), these can be cracked into multiple individual loads.

There is a general need to improve the efficiency of such processes.

SUMMARY

In an example arrangement there is provided circuitry comprising:

an instruction decoder to decode a gather load instruction having a vector operand comprising a plurality of vector entries, in which each vector entry defines, at least in part, a respective address from which data is to be loaded;

the instruction decoder being configured to generate a set of load operations relating to respective individual addresses in dependence upon the vector operand, each of the set of load operations having a respective identifier which is unique with respect to other load operations in the set, control circuitry to maintain a data item for the gather load instruction, the data item including a count value representing a number of load operations in the set of load operations awaiting issue for execution; and execution circuitry to execute the set of load operations;

the control circuitry being configured, in response to a detection from the count value of the data item associated with a given gather load instruction that the set of load operations generated for the given gather load instruction has reached a predetermined stage relative to execution of all of that set of load operations, to control handling of a consumer instruction, being an instruction which depends upon the completion of the given gather load instruction.

In another example arrangement there is provided a method comprising:

decoding a gather load instruction having a vector operand comprising a plurality of vector entries, in which each vector entry defines, at least in part, a respective address from which data is to be loaded;

the decoding step comprising generating a set of load operations relating to respective individual addresses in dependence upon the vector operand, each of the set of load operations having a respective identifier which is unique with respect to other load operations in the set, and maintaining a data item for the gather load instruction, the data item including a count value representing a number of load operations in the set of load operations awaiting issue for execution;

executing the set of load operations; and in response to a detection from the count value of the data item associated with a given gather load instruction that the set of load operations generated for the given gather load instruction has reached a predetermined stage relative to execution of all of that set of load operations, controlling handling of a consumer instruction, being an instruction which depends upon the completion of the given gather load instruction.

In another example arrangement there is provided circuitry comprising:

means for decoding a gather load instruction having a vector operand comprising a plurality of vector entries, in which each vector entry defines, at least in part, a respective address from which data is to be loaded;

the decoding means comprising means for generating a set of load operations relating to respective individual addresses in dependence upon the vector operand, each of the set of load operations having a respective identifier which is unique with respect to other load operations in the set, and means for maintaining a data item for the gather load instruction, the data item including a count value representing a number of load operations in the set of load operations awaiting issue for execution;

means for executing the set of load operations; and means, responsive to a detection from the count value of the data item associated with a given gather load instruction that the set of load operations generated for the given gather load instruction has reached a predetermined stage relative to execution of all of that set of load operations, for controlling handling of a consumer instruction, being an instruction which depends upon the completion of the given gather load instruction.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
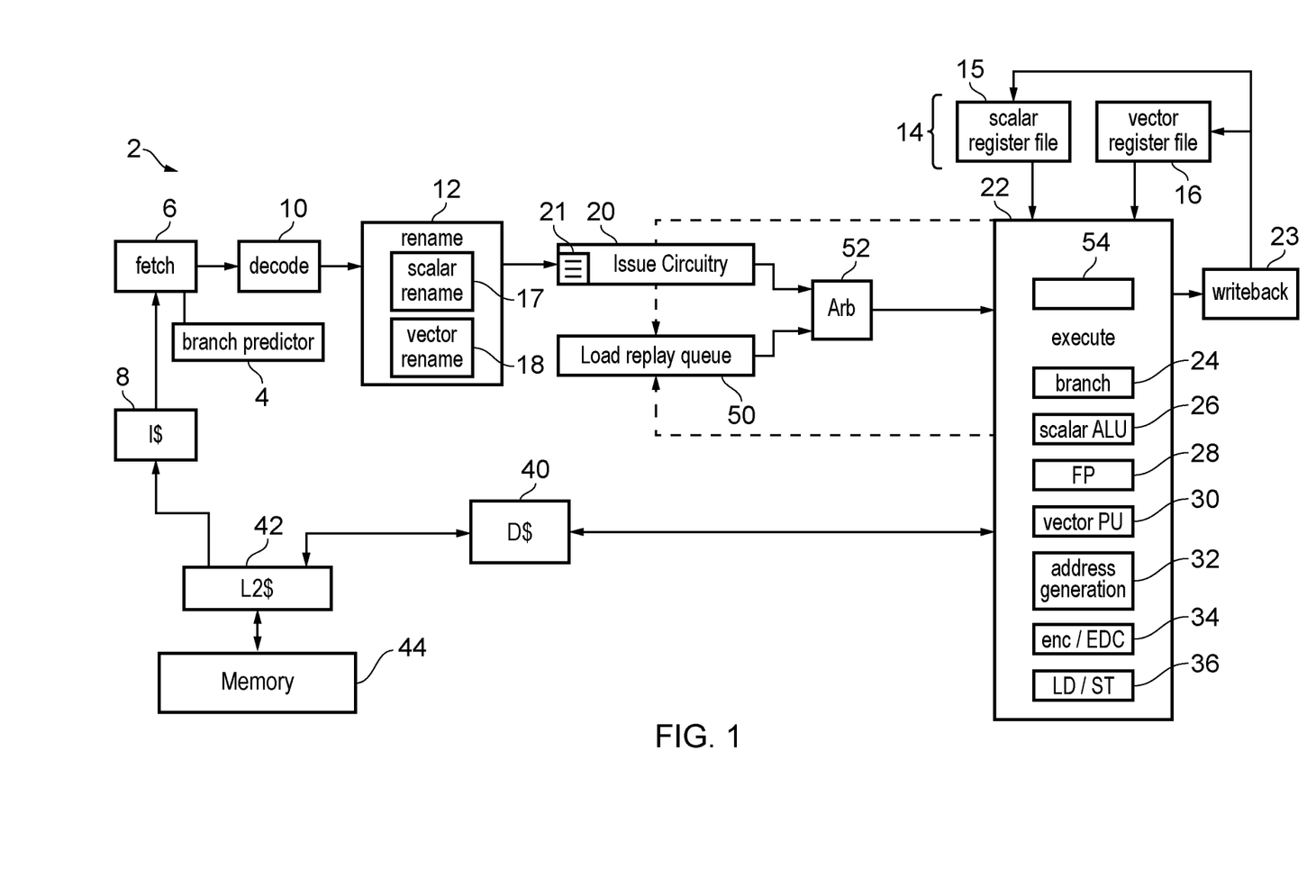
FIG. 1 schematically illustrates an example of a data processing apparatus.

Referring now to the drawings, FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate micro-operations for controlling the subsequent stages of the pipeline. Some instructions may be decoded into a single micro-operation while others may be decoded into two or more micro-operations.

A rename stage 12 performs register renaming to map architectural register specifiers identified by the instructions to physical register specifiers identifying registers 14 provided in hardware. In some examples this can contribute to providing so-called out-of-order execution in which micro-operations and/or processing instructions may be handled in an order other than (or independent of) their program order, or other than an order in which micro-operations were generated at the decode stage. The rename stage 12 may include separate scalar and vector rename engines 17, 18 for performing renaming for scalar and vector register files 15, 16 respectively. Register renaming can be useful for supporting out-of-order execution as this can allow hazards (for example due to false dependencies) between micro-operations specifying the same architectural register to be eliminated by mapping them to different physical registers in the hardware register file, to increase the likelihood that the micro-operations can be executed in a different order from the program order in which the corresponding instructions were fetched from the cache 8, which can improve performance by allowing a later micro-operation to execute while an earlier micro-operation is waiting for an operand to become available. The ability to map architectural registers to different physical registers can also facilitate the rolling back of architectural state in the event of a branch misprediction.

An issue stage 20 queues micro-operations awaiting execution in an issue queue 21, for example until the required operands for processing those micro-operations are available in the registers 14. The issue stage will be described in further detail below, but for now it is noted that it can receive an indication or notification from an execute stage 22 that can be used to indicate that a queued instruction or micro-operation which had been awaiting the generation of its source data should be "woken up" and issued to the execute stage 22.

Arbitration of operations (such as load operations) to be executed is provided by arbitration circuitry 52 to select a next load operation to be issued for execution. A translation lookaside buffer (not shown) can be provided before or after the arbitration circuitry if required for address translation of load or other instructions.

A so-called load replay queue 50 provides a queue for load instructions which won arbitration but were not able to finish execution, or load instructions which are currently in execution but have not yet finished execution. In other words, so-called "in flight" instructions are tracked by the load replay queue and, in the case of cancelled instructions, those instructions can be re-issued for a further attempted execution from the load replay queue. Arbitration by the arbitration circuitry 52, for providing a load instruction to a so-called load pipe or load pipeline 54 of the execute stage 22 takes place between load instructions in the issue queue 21 and load instructions in the load replay queue 50. The load pipe 54 is drawn separately for schematic illustration but may be implemented by a load/store unit 36.

Note that more than one load pipe may be provided, by which load instructions are executed over a pipeline period of (for example) four cycles. For example, a system may have (say) three load pipes. Only one such load pipe is shown in FIG. 1 for clarity of the diagram but more load pipes could be provided, for example as further instances of the execute stage 22. Arbitration takes place for each load pipe so that where there are (say) n load pipes, there can be up to n load instructions (up to a maximum of one for each load pipe) which win arbitration at each arbitration cycle.

The execute stage 22 executes the micro-operations to carry out corresponding processing operations.

A writeback stage 23 writes results of the executed micro-operations back to the registers 14.

The execute stage 22 may include a number of execution units such as a branch unit 24 for evaluating whether branch operations have been correctly predicted, a scalar ALU (arithmetic logic unit) 26 for performing arithmetic or logical operations on scalar operands stored in the scalar register file 15, and a floating-point unit 28 for performing operations using floating-point operands. A vector processing unit 30 performs vector operations on vector operands stored in the vector register file 30. An address generation unit (AGU) 32 generates addresses for load/store operations based on scalar operands in the scalar register file 15. The load/store unit 36 performs load operations to load data from a memory system to the registers 14 or store operations to store data from the registers 14 to the memory system. In this example the memory system includes a level one instruction cache 8, a level one data cache 40, a level two cache 42 which is shared between data and instructions, and main memory 44, but it will be appreciated that this is just one example of a possible memory hierarchy and other implementations can have further levels of cache or a different arrangement. The execute stage 22 may also have a unit 34 providing one or both of the functions of an encryption unit for performing encryption/decryption operations, and/or an error detection code unit for generating error detecting or correcting codes (codes providing redundancy of encoding which enables detection/correction of random errors occurring due to hardware faults).

It will be appreciated that the pipeline shown in FIG. 1 is just one example and other examples may have different sets of pipeline stages or execution units, and in particular may have a different number of load pipes 54.

FIG. 1 shows an example of the logical flow of signals between different parts of the processing system, but it will be appreciated that the physical layout of the circuit components for the various elements of the apparatus may be different. For example, the vector register file 16 may be physically remote from the scalar register file 15.

In practice, most instructions which require computation of an address using the address generation unit 32 use scalar operands to define the address. Instructions for which the address depends on a vector operand in the vector register file 16 are less common. In some examples, in practice the address generation unit 32 may be positioned closer to the scalar register file 15 and in some examples there may not in fact be any circuit wiring directly connecting the address generation unit to the vector register file 16. This means that for instructions which require an address to be computed based on a vector operand, a register move micro-operation may be required to move the relevant data from the vector register file 16 to the scalar register file 15 before the address generation unit 32 can perform its address computation.

Figure 2:
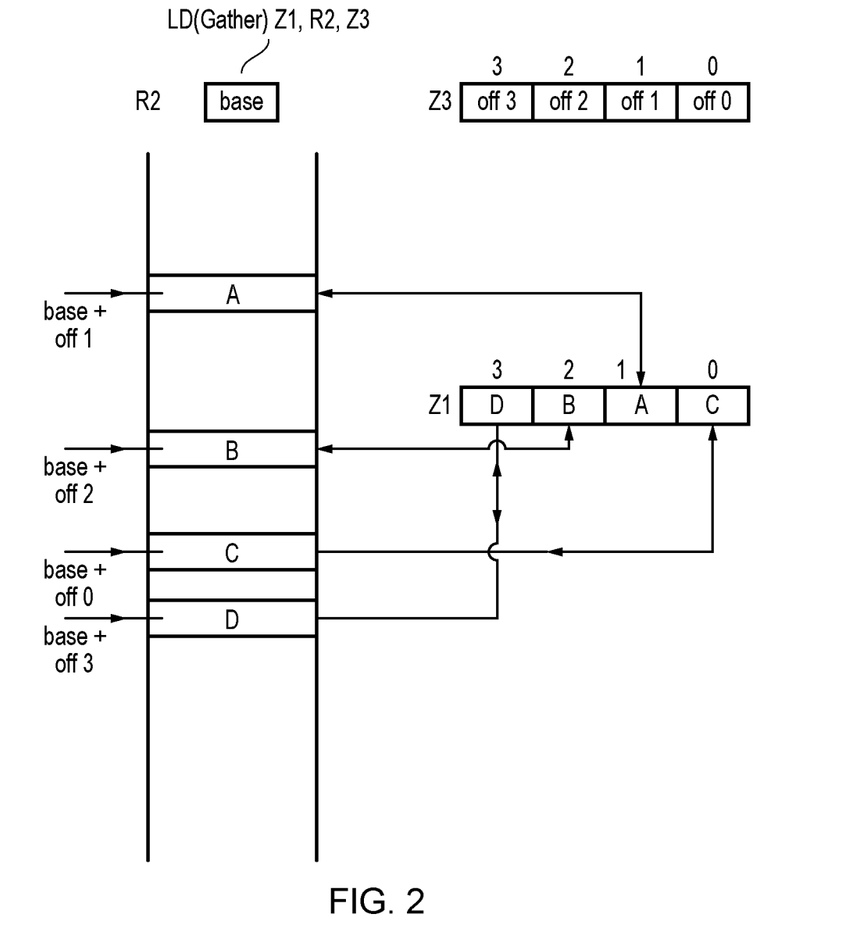
FIG. 2 shows an example of a gather load instruction.

FIG. 2 shows an example of instructions which may require an address to be computed based on a vector operand.

In particular, FIG. 2 shows an example of a gather-load instruction LD(Gather) which specifies a vector register Z1 to which data is to be loaded from memory. The instruction also specifies a scalar register R2 and a further vector register Z3, where the addresses of two or more data access operations to be triggered by the gather load instruction are to be determined based on the registers R2 and Z3.

In this example the scalar register R2 specifies a base address and the vector register Z3 specifies a vector of offset values, where each of the addresses for the respective data access operations is determined by adding a respective offset from Z3 to the base address in R2.

For example, the data value to be loaded into element 0 of register Z1 in response to a gather load instruction may be obtained from a location in memory whose address is determined by adding offset 0 (read from element 0 of vector register Z3) to the base address in register R2. Similarly for the other data elements of the destination register Z1, the respective data values loaded have addresses identified by adding the other offsets specified in the remaining data elements of register Z3 to the base address.

Unlike for a contiguous load instruction, with gather load instructions, the addresses of the respective data access operations may be non-contiguous in the address space. Also it is not essential for the offsets to be ordered sequentially, so it is possible for offset 0 to be either greater than or less than offset 1 for example. It is not essential for a load/store operation to be triggered for every element of the vector register Z1. It is possible for some vector processing lanes to be masked out by predication.

While FIG. 2 shows an example where the vector operand Z3 specifies a vector of offsets and the scalar address operand R2 specifies the base address, another option may be for the data access operations triggered by the gather load operations to compute their addresses based on a vector operand Z3 specifying base addresses in each data element of the vector, and a shared or common offset to be applied to each of those base addresses being specified in either a scalar register or an immediate operand specified in the encoding of the instruction.

A further option is one in which two vector operands are provided, so that a combination (such as an additive combination) of element values at corresponding positions or "lanes" in each vector operand provides a respective one of the gather load addresses.

A process used by the decode stage 10 in respect of gather load instructions is to generate (or "crack") a set of micro-operations for a gather load instruction. These may include a set of individual loads each relating to a respective one of the vector positions in the gather load instruction.

Therefore in the example of FIG. 2, which the gather load instruction has a scalar operand, in which the respective addresses from which data is to be loaded are defined by one of: a base address defined by the scalar operand, modified by respective entries of the vector operand; or a set of base addresses defined by the respective entries of the vector operand, each modified by the scalar operand.

Figure 3:
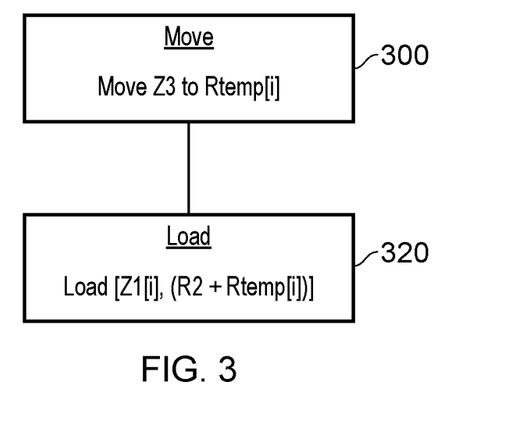
FIG. 3 schematically illustrates a set of micro-operations.

In the present examples, a suitable set of micro-operations may include those shown schematically in FIG. 3.

Referring to FIG. 3, a gather-load instruction may be decoded by the decode stage 10 into a number of different micro-operations to be performed by the processing pipeline. These may include: register move micro-operations 300 for moving data from respective elements of the vector register Z3 in the vector register file 16 into corresponding temporary registers Rtemp[i] within the scalar register file 15; and load micro-operations 320 themselves which carry out the actual transfer of data between the register Z1 in the vector register file 16 and respective locations in memory identified by the computed addresses of the respective data access operations based on the scalar register R2 and the allocated temporary registers Rtemp[i] which were filled with the data transferred from the vector register file.

Optionally, address generation micro-operations (not shown or represented in FIG. 3) may be generated for controlling the address generation unit 32 to calculate the addresses of the respective data access operations based on the scalar register R2 and the allocated temporary registers Rtemp[i] which were filled with the data transferred from the vector register file. However, in the present example these are not required, in that the present example makes use of a datapath where a load micro-operation has its address generated before data is accessed as part of the data flow.

In general, there may be one instance of the operations 300 for the gather load instruction, and as many instances of the operations 320 as there are individual loads to be performed in order to implement the gather load.

Optionally, some variants of the gather-load instructions could also include further micro-operations for updating the base address (or base addresses) identified by the address defining operands. For example some forms of load instructions may use a pre-operation or post-operation update of the base address, which can help allow the same instruction to be executed in a loop for stepping through a range of addresses, without needing a further instruction to be executed to update the address pointer for the next loop iteration.

Figure 4:
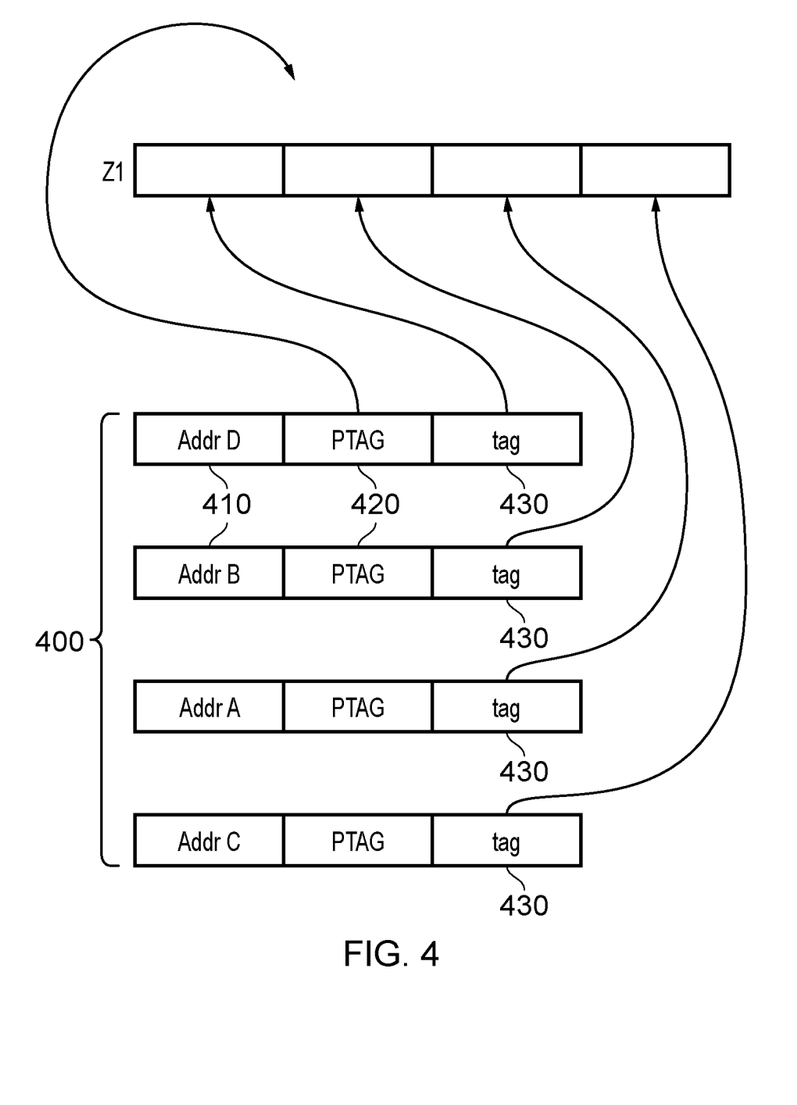
FIG. 4 schematically illustrates a asset of load operations.

Referring now to FIG. 4, each of the individual loads 400 represented by the micro-operations 320 in FIG. 3 has the same destination register identity (for example a so-called physical tag or PTAG defining an entry in the vector register file). Each individual load is also tagged with a distinct identifier used to indicate the element within the destination register that needs to be updated with the result returned by the load. So in FIG. 4, using the same destination register Z1 as shown in FIG. 2, each of four loads 400 has a respective address field 410, a common PTAG 420 indicating the destination register Z1 and a respective tag 430 so that each tag identifies an element within the destination register. In these examples, each load operation for a given gather load instruction has an associated destination identifier 420 defining a destination register common to the set of load operations for the given gather load instruction.

Figure 5:
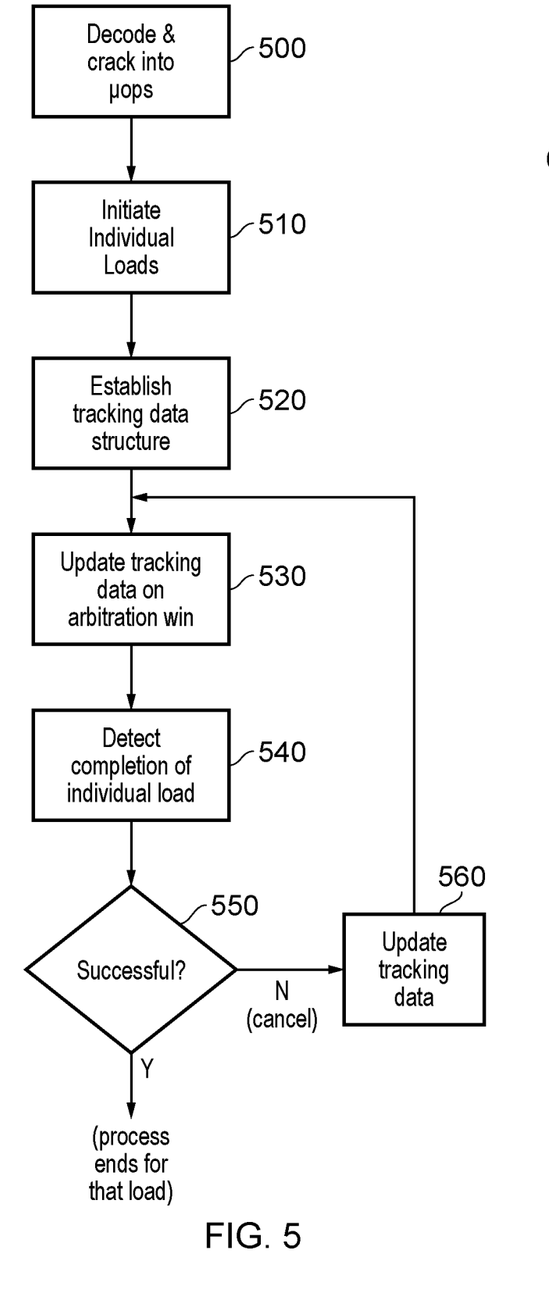
FIGS. 5 and 6 are schematic flowcharts illustrating respective methods.
Figure 6:
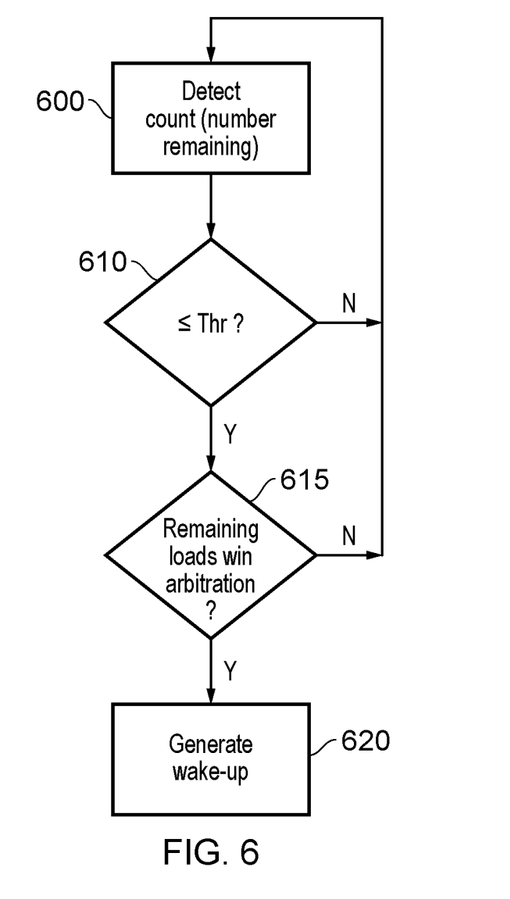

FIG. 5 and FIG. 6 are schematic flowcharts representing overall operations including the use of the micro-operations discussed above and other functionality controlled by circuitry to be described below in connection with handling a gather load instruction.

Referring to a step 500, the gather load instruction is decoded and cracked into micro-operations such as those shown in FIG. 3, for example by the decode stage 10. At a step 510, the individual loads are initiated. This can involve various stages including, for example, renaming and queueing in the issue queue 21.

At a step 520, a tracking data structure is generated in respective of the gather load instruction. This generation is carried out in the present example after register renaming. The tracking data structure for a gather load instruction can be established or generated in response (for example) to the issue of the first individual load operation of a set which has been cracked from that gather load instruction. This can, for example, be detected by a lack of match between identifiers such as PTAGs associated with tracking data structures already in existence and the corresponding identifier for the newly issued load instruction.

Therefore, in example arrangements, the circuitry is configured to maintain a data item for each currently pending gather load instruction including the destination identifier;

and to detect whether the destination identifier for a newly issued load operation corresponds to a destination identifier of an existing data item, and if not, to initiate generation of the a data item for a gather load instruction associated with that destination identifier.

Figure 7:
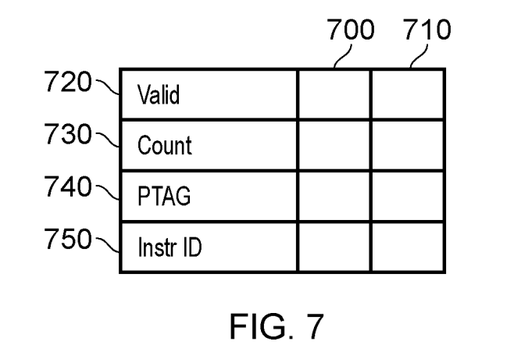
FIG. 7 schematically illustrates a tracking data structure.

An example of such tracking data is shown in FIG. 7 with each entry 700, 710 . . . corresponding to a gather load instruction and including fields such as a valid bit or indicator 720, a count value 730 to be described further below, the PTAG 740 of the destination register in the vector register file and an identifier 750 of the gather load instruction.

The identifier 750 is used to determine if the entry needs to be invalidated if the gather instruction is flushed, and is invalidated/deallocated when the gather instruction completes so that future instructions can use it.

In response to the establishing of the tracking data structure for a gather load instruction, an entry is populated in the tracking data structure of FIG. 7. The valid bit 720 is set to indicate "valid"; the PTAG 740 and instruction identifier 750 fields are populated for that gather load instruction; and the count value 730 is initialised.

Regarding the count value, it will be appreciated that a count of the individual load instructions (which will be described in more detail below) could count upwards or downwards, and could count in units of 1 or another increment/decrement value. In the case of counting upwards, this could be from 0 or from another starting value. In the case of counting downwards, this could be from a number equal to the number of individual loads to be performed or it could be from another starting value. For the sake of clarity of the present description, an example arrangement will be described in which the count value 730 in an entry 700, 710 relating to a particular gather load instruction is initialised to the number of individual loads resulting from the decoding and cracking of that gather load instruction, and counts downwards from there towards zero. The skilled person will however appreciate that the other options discussed above are equally applicable and it is considered that counting upwards or downwards, from whichever starting value towards whichever ending value, and whatever increment/decrement value or threshold value is used, as long as the count indicates a number of remaining load instructions and the threshold value indicates a number of load instructions such as the number which can be executed in parallel, all of these variants fall within the scope of the present disclosure and of the claims.

Therefore, in examples, the data item for a gather load instruction comprises one or more selected from the list consisting of: an identifier 750 of the gather load instruction which is unique with respect to other instructions decoded by the instruction decoder; a data item validity indicator 720; and an identifier 740 common to the set of load operations for that gather load instruction.

So, in the current example, the count value for the destination register Z1 is initialised to a value of 4, this being the total number of loads applicable to the gather load instruction.

From the issue queue (and/or the load replay queue), load instructions are issued for execution under the control of the arbitration circuitry.

Steps 530-550 (and optionally 560 depending on the outcome of 550) are carried out for each of the individual loads.

Whenever an individual load operation wins arbitration and is issued, then at a step 530 the tracking data relating to the parent gather load instruction is updated. In particular, the count value 730 is decremented by 1 in response to active execution of a load instruction.

Then, at a step 540 the completion of an individual load operation is detected. If this, however, unsuccessful, at a step 550, then the tracking data is again updated at a step 560 so as to increment the count 730 relating to the parent gather load instruction and the steps 530, 540 . . . continue for that load. If the outcome at the step 550 is "yes" then no more updating of the tracking structure occurs for that load (but the steps 530-560 may be performed for other outstanding loads).

It is not necessary to detect the successful completion of a load instruction at this stage; as discussed below, a relevant detection (from the point of view of updating the count value) can be an unsuccessful or cancelled execution, in response to which (as discussed below) the count value is incremented.

The step 530 represents an example of the execution circuitry being configured to update the count value to indicate a lower number of load operations in response to selection, by the arbitration circuitry, of one or more of the load operations.

The step 560 represents an example of the execution circuitry being configured to update the count value to indicate a higher number of load operations in response to failure of one or more load operations to complete execution.

A process is shown in FIG. 6 which monitors the count value 730 in order to detect at a step 600, a number of individual load operations remaining to be performed successfully (in other words, the number waiting to win arbitration). If, at a step 610, that number becomes less than or equal to a threshold Thr then control is passed to a step 615 at which a detection is made as to whether all of the remaining individual loads (applicable to that gather load instruction) have won arbitration. If the outcome is "no" at either the step 610 or the step 615 then control returns to the step 600. If however, the process reaches the affirmative outcome of the step 615 then a wake-up (to be described below) is generated at a step 620. Such a notification will be described in further detail below. If not, the monitoring process continues with the step 600.

Note that the count can increase as well as decrease, for example by cancellation of a load instruction, so that the fact that the test at the step 610 has been passed at a particular cycle or instance does not imply that it will be passed at a next cycle.

The threshold Thr can indicate a stage within the overall execution of micro-operations relating to a gather load instruction at which the gather load instruction is almost complete. Therefore, in an example arrangement which has a count value 730 which counts down to 0 (representing no remaining individual loads to be performed, or in other words completion of the parent gather load instruction), the threshold Thr may be greater than 0. In an example arrangement in which 1 individual load is executed at a time, the threshold Thr may be 1. In a less-aggressive example, in which the system waits for all load instructions to have completed or at least to be underway, the threshold Thr could be zero. In other words, although Thr could be the same as the number of load pipes, it could in fact be a different number (such as Thr being zero in a system which has one or more load pipes).

It is not excluded within the scope of the present disclosure that the number of individual load instructions cracked from a gather load instruction may be lower than the threshold value Thr at the outset. This could occur because, for example, the parallelism of the execute stage(s) 22 is greater than the vector width associated with a gather load instruction, and/or because one or more lanes relating to the gather load instruction are predicated out. In such cases the test at the step 610 will pass at each instance.

Another example arrangement may employ parallel execution (for example, multiple load pipes 54 operable in parallel) in which n individual loads (where n may be, for example, 3) can be executed at a time and/or in parallel. This can potentially leading to the update of the count value in a given cycle by a number of loads greater than one. In such examples, the threshold Thr may be greater than one, for example 3.

If, for example the threshold Thr is 1, then the notification will be triggered when one load operation remains to be issued. If the threshold Thr is zero then the notification will triggered when all of the load operations have been issued but not necessarily all completed. Each of these represents an example of a predetermined stage with respect to completion of all of the load operations and represents an example of an early speculative wake up of a consumer instruction (as discussed below) with respect to waiting until all of the load operations have successfully completed.

Note that in some examples, the predetermined stage may include a stage at which all loads have actually completed (in which case the "predetermined number" or Thr referred to in the present description may be zero). In other examples, the definition of the predetermined stage may exclude a stage at which all loads have completed and may instead refer to a stage (such as any of those described above) before the stage at which all loads have fully completed.

Again, it will be appreciated that the functionality of the steps 600 . . . 620 can be carried out by dedicated circuitry, not shown in FIG. 1 but described below.

Therefore, FIG. 1, which is configured to operate according to the techniques described here, provides an example of circuitry comprising:

an instruction decoder 10 to decode a gather load instruction having a vector operand (Z3) comprising a plurality of vector entries, in which each vector entry defines, at least in part, a respective address from which data is to be loaded;

the instruction decoder being configured to generate a set of load operations 320 relating to respective individual addresses in dependence upon the vector operand, each of the set of load operations having a respective identifier 430 which is unique with respect to other load operations in the set, control circuitry to maintain a data item 700, 710 for the gather load instruction, the data item including a count value 730 representing a number of load operations in the set of load operations awaiting issue for execution; and execution circuitry 22 to execute the set of load operations;

the control circuitry being configured, in response to a detection from the count value of the data item associated with a given gather load instruction that the set of load operations generated for the given gather load instruction has reached a predetermined stage relative to execution of all of that set of load operations, to control handling of a consumer instruction, being an instruction which depends upon the completion of the given gather load instruction.

Example arrangements of this type can potentially reduce the complexity of a load execution pipeline, in that address generation logic can remain unmodified and can use a scalar register file to read its operands such that the functionality described here can be achieved without requiring any new support to access the vector register file. Also the mechanism of example embodiments can reduce the overall latency of execution of an instruction stream including gather load instructions.

The identifier 420 common to the set of load operations for that gather load instruction may comprise an identifier of the destination register common to that set of load operations.

In general, the gather load instruction may define a target vector register (such as Z1) having a plurality of entries to store data loaded in response to the gather load instruction; the identifier 430 for each load operation of the set of load operations generated for a gather load instruction indicates an entry in the target vector register; and the execution circuitry is configured to transfer data loaded to the destination register in response to a given load operation to the respective entry in the target vector register defined by the identifier for the given load operation.

The use that is made of the wake-up generated at the step 620, for example to control handling of the consumer instruction, will be discussed below.

Figure 8:
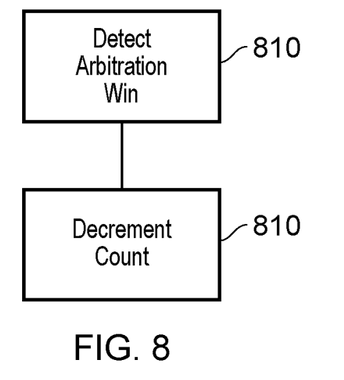
FIGS. 8 to 10 are schematic flowcharts illustrating respective methods.

In partial summary of the steps discussed above, FIGS. 8 and 9 are schematic flow charts of the variation of the count value 730 for a gather load instruction. In FIG. 8, in response to detecting an arbitration win at a step 800 for an individual load derived from a gather load instruction, the count value 730 for that gather load instruction is decremented (or more generally, changed so as to indicate a smaller remaining number of individual loads to be executed) at a step 810.

Figure 9:
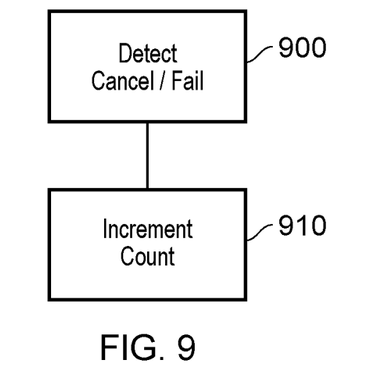

In FIG. 9, in response to detecting the cancellation or other failure of an individual load operation at a step 900, the count value 730 for the parent gather load instruction is incremented (or more generally, changed so as to indicate a greater outstanding number of individual loads to be performed) at a step 910.

Figure 10:
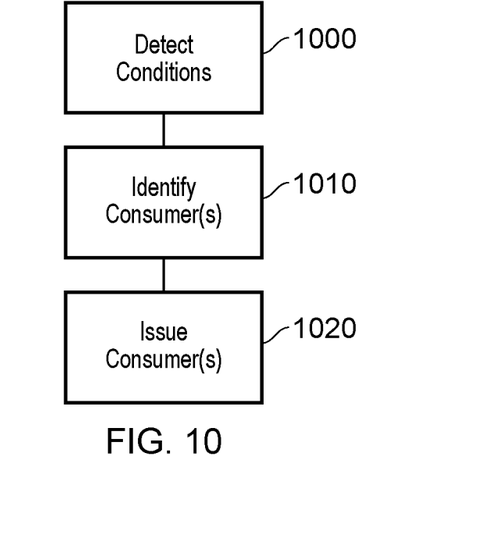
Figure 11A:
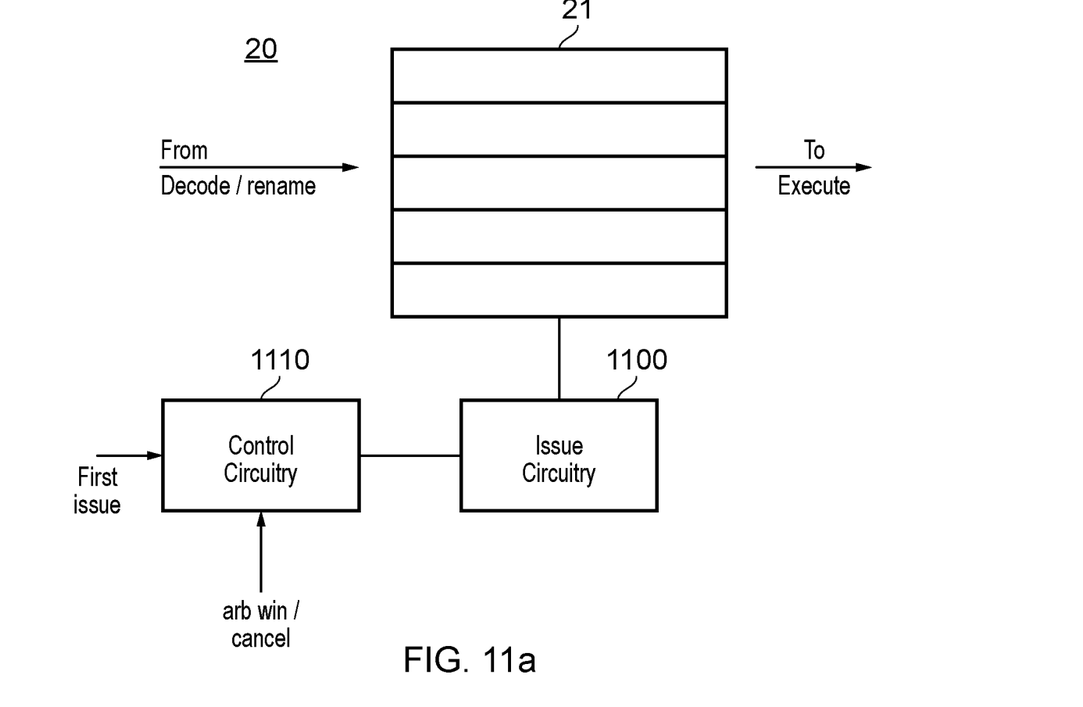
FIG. 11*a* schematically illustrates an issue stage.
Figure 11B:
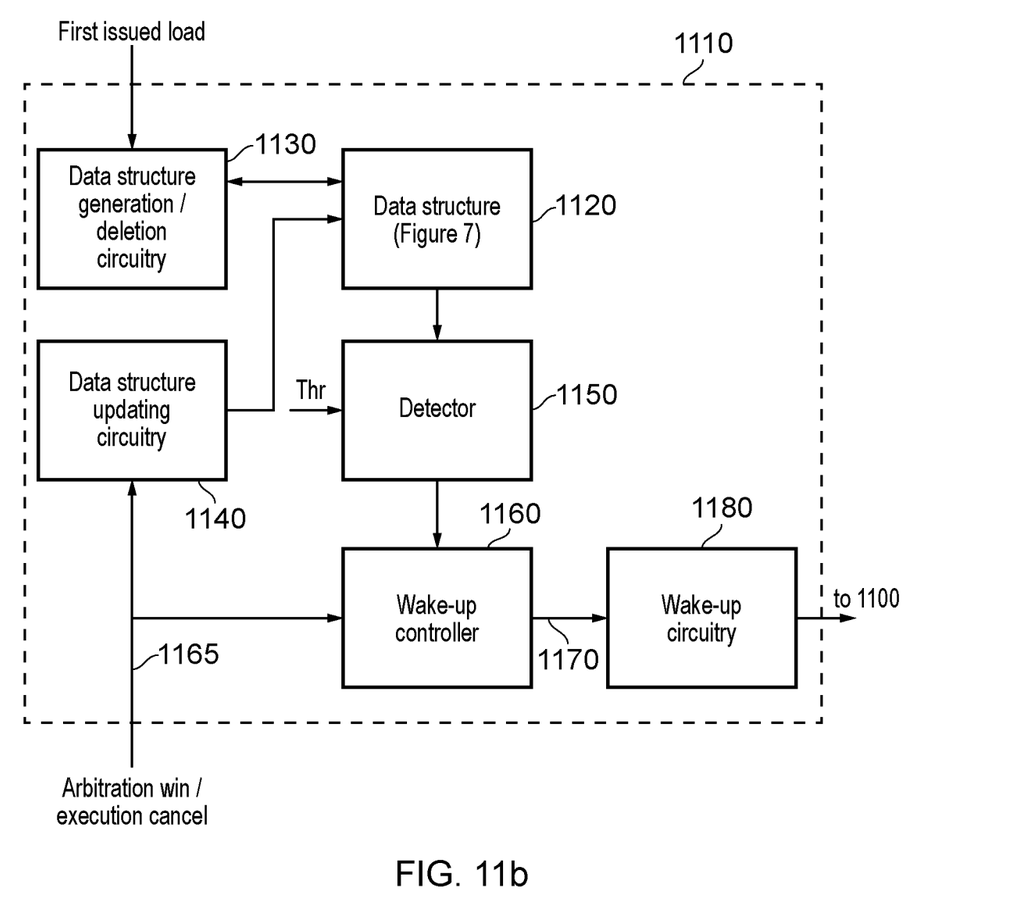
FIG. 11*b* schematically illustrates control circuitry.

FIGS. 10, 11a and 11b serve to illustrate an example of the use of the wake-up generated at the step 620 of FIG. 6.

In an out-of-order processor such as that shown in FIG. 1, instructions are issued potentially before their source data or operands are available. The instructions are entered into the issue queue 21 (or plural issue queues, not shown) where they wait for their operands. A process refers to as wakeup causes the instruction to be dispatched to execution when its operands are ready. Wakeup typically takes place in response to all of the operands being ready. In the present examples, however, in order to provide for the efficient waking up of dependent or "consumer" instructions which depend upon the results of a gather load operation, the wake-up at the step 620, which can be in response to the overall gather load instruction being almost but not necessarily completely executed, can be used to cause wakeup.

The overall process is shown in a schematic flowchart of FIG. 10 in which, at a step 1000, the circuitry to be described with reference to FIG. 11b detects a set of conditions to be discussed below and, at a step 1010 identifies one or more consumer instructions waiting for the results of the gather load operation indicated by that notification. At a step 1020, the one or more consumer instructions are issued for execution.

Referring to FIG. 11a, the issue stage 20 comprises an issue queue 21 as discussed above which receives instructions from the decode 10 and rename 12 stages and provides instructions to the execute stage 22, under the control of issue circuitry 1100 and is responsive to a wakeup signal or indication which in turn is generated at the step 620. Control circuitry 1110 oversees the wakeup process and also handles the gather load data structure discussed above.

Therefore, FIGS. 10 and 11a schematically illustrate an example of the controlling of handling of the consumer instruction, in that the circuitry 2 comprises an instruction queue 21 to store data defining decoded instructions awaiting execution; the execution circuitry being configured to initiate execution of the consumer instruction in response to the detection 620 (as notified by the notification).

For example, the issue circuitry 20 may be configured to initiate transfer or issue of the consumer instruction to the execution circuitry in response to the detection.

The predetermined stage may comprise completion or active execution of all but a predetermined number of the set of load operations. Either situation can be defined by the threshold value Thr discussed above and the step 610.

For example, the execution circuitry 22 may be configured, in response to the detection, to initiate execution of the consumer instruction when execution of a last remaining group of the predetermined number of load operations of the set of load operations for the given gather load instruction has commenced, for example by detecting an arbitration win for the last remaining group. In this example, the execution circuitry 22 may be configured, in response to the detection, to initiate execution of the consumer instruction in response to the arbitration circuitry selecting the last remaining group of the predetermined number of load operation of the set of load operations for the given gather load instruction for execution.

Note also that it is possible for the actively executing load operations or the last group of load operations that have started executing to cancel which in turn can be arranged to cancel the consumer instruction and put it back to sleep in the issue queue, awaiting a next wake up. A cancelled load operation will re-execute and has no effect on other load operations in the group. The order execution of the load operations can depend on several factors and as a result the last group of load operations that wakes up the consumer is not predetermined and can vary over the course of execution.

The predetermined or threshold number may be less than or equal to a number of load operations which the execution circuitry can perform in parallel, for example, 1 or a number such as an integer other than 1. In other words, even where more than one load can be executed in parallel, it is not a requirement to set the value Thr to that number of loads. For example, if there are 3 pipes (capable of executing 3 loads in parallel) and 3 load instructions remain, it is possible for one or two to execute first and then the remaining one(s) could execute.

FIG. 11b schematically illustrates the control circuitry 1110.

The data structure of FIG. 7 is stored in a memory circuitry 1120, drawn as part of the control circuitry 1110 but which could instead be external to (and simply accessed by) the control circuitry 1110. In some examples, the memory circuitry may be implemented as an array of flops or other similar circuitry and may, in some examples, reside in the load/store unit. Data structure generation/deletion circuitry 1130 handles the establishment of the data structure (the step 520 above) in response to the first instance of issuing of an individual load having an identifier such as a PTAG which does not match the PTAG of any existing entry in the data structure. The circuitry 1130 also handles the deletion of the data structure for a gather load instruction (a) when its count is zero (showing that all the individual loads have been completed) and (b) there are no individual loads still in execution by any of the load pipes (which in turn means that it is too late for any individual load to be cancelled).

Data structure updating circuitry 1140 handles the updating of the count value, for example (in an arrangement in which the count runs downwards) decrementing the count in response to an individual load operation winning arbitration by the arbitration circuitry 52, and incrementing the count value in response to cancelation of an executing individual load operation.

A detector 1150 detects (corresponding to the step 610) when the count value indicates a remaining number of individual load operations which is less than or equal to a threshold Thr, which threshold can be equal (for example) to the number of load pipes or opportunities for parallel execution of load operations. The threshold Thr can be populated as a hardware configuration indicating a number of load pipes.

A wake-up controller 1160 detects a set of conditions (the step 1000 above), namely:

the detector indicates that the number of remaining load operations for a given gather load is less than or equal to Thr;

the one or more outstanding load operations have won arbitration (as detected by the wakeup controller 1160 receiving the signal 1165 indicating arbitration wins)

In response to these two conditions being met, control passes to the step 1010 and the wakeup controller initiates the waking up of the consumer instruction which is waiting for the result of the given gather load operation.

Note that the detection (by the circuitry 1150) of the data structure is updated a cycle later, so that the situation can arise that all remaining load operations have won arbitration and the count indicates that a non-zero (though less than or equal to Thr) number of load operations are outstanding.

A worked example (illustrating the operations of the circuitry of FIG. 11b in accordance with the flowchart of FIG. 6) is provided below.

Example A—Threshold and Number of Load Pipes=1

| | |
|---|---|
| Count remaining (detected at the steps 600/610) | 2 |
| Number of remaining loads winning arbitration (step 615) | (immaterial) |
| Outcome | Step 620 not executed |

Example B—Threshold and Number of Load Pipes=1

| | |
|---|---|
| Count (detected at the steps 600/610) | 1 |
| Number of remaining loads winning arbitration (step 615) | 0 |
| Outcome | Step 620 not executed |

Example C—Threshold and Number of Load Pipes=1

| | |
|---|---|
| Count (detected at the steps 600/610) | 1 |
| Number of remaining loads winning arbitration (step 615) | 1 |
| Outcome | Step 620 executed and consumer instruction woken up |

Example D—Threshold and Number of Load Pipes=3

| | |
|---|---|
| Count (detected at the steps 600/610) | 4 |
| Number of remaining loads winning arbitration (step 615) | (immaterial) |
| Outcome | Step 620 not executed |

Example E—Threshold and Number of Load Pipes=3

| | |
|---|---|
| Count (detected at the steps 600/610) | 3 |
| Number of remaining loads winning arbitration (step 615) | 2 |
| Outcome | Step 620 not executed |

Example F—Threshold and Number of Load Pipes=3

| | |
|---|---|
| Count (detected at the steps 600/610) | 2 |
| Number of remaining loads winning arbitration (step 615) | 2 |
| Outcome | Step 620 executed and consumer instruction woken up |

Note that as discussed above, for a current arbitration cycle, the control circuitry is configured to indicate the count value applicable to a preceding arbitration cycle. Accordingly, the predetermined stage (at which the consumer instruction is woken up) may comprise (i) a remaining number of the set of load operations, indicated by the count value, is less than a threshold number; and (ii) selection, by the arbitration circuitry in the current arbitration cycle, of all of the remaining number of the set of load operations. The wakeup controller 1160 provides a signal 1170 to wakeup circuitry 1180. The wakeup circuitry's normal operation is to identify and wake up a consumer instruction when all of its producer instructions have completed. The signal 1170 causes the consumer instruction of a gather load instruction to be woken up when the last remaining load instructions have won arbitration. So this is a speculative wakeup. If one or more actively executing load instructions (which may include one of the last remaining load instructions or one or more previously issued load instructions still in flight) cancels or otherwise does not complete execution, the wakeup of that consumer instruction will have been incorrect and it will need to be cancelled and returned to the issue queue. However, if the speculative wakeup is correct then a potential performance improvement can be obtained by the early wakeup of the consumer instruction. Therefore, in examples the control circuitry is configured to cancel execution of the consumer instruction before completion of execution in response to failure of one or more of the set of load operations to complete execution.

Therefore, FIGS. 11*a* and 11*b* provide an example of an instruction queue 21 to store data defining decoded instructions awaiting execution; and issue circuitry 1100 configured to initiate transfer of the consumer instruction to the execution circuitry;

the control circuitry 1110 comprising wake-up circuitry 1160, 1180 to initiate issue of the consumer instruction by the issue circuitry in response to the detection.

Figure 12:
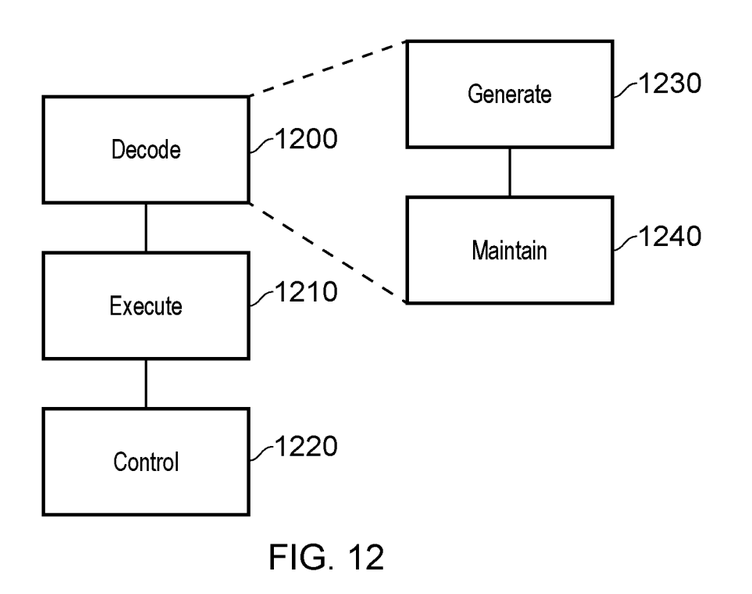
FIG. 12 is a schematic flowchart illustrating a method.

In overall summary, FIG. 12 is a schematic flowchart illustrating a method comprising:

decoding (at a step 1200) a gather load instruction having a vector operand comprising a plurality of vector entries, in which each vector entry defines, at least in part, a respective address from which data is to be loaded;

the decoding step comprising generating (at a step 1230) a set of load operations relating to respective individual addresses in dependence upon the vector operand, each of the set of load operations having a respective identifier which is unique with respect to other load operations in the set, and maintaining (at a step 1240) a data item for the gather load instruction, the data item including a count value representing a number of load operations in the set of load operations awaiting issue for execution;

executing (at a step 1210) the set of load operations; and in response to a detection from the count value of the data item associated with a given gather load instruction that the set of load operations generated for the given gather load instruction has reached a predetermined stage relative to execution of all of that set of load operations, controlling (at a step 1220) handling of a consumer instruction, being an instruction which depends upon the completion of the given gather load instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function, in which case software or program instructions by which the function is performed, and a providing medium such as a non-transitory machine-readable medium by which such software or program instructions are provided (for example, stored) are considered to represent embodiments of the disclosure. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Circuitry comprising:
an instruction decoder to decode a gather load instruction having a vector operand comprising a plurality of vector entries, in which each vector entry defines, at least in part, a respective address from which data is to be loaded;
the instruction decoder being configured to generate a set of load operations relating to respective individual addresses in dependence upon the vector operand, each of the set of load operations having a respective identifier which is unique with respect to other load operations in the set,
control circuitry to maintain a data item for the gather load instruction, the data item including a count value representing a number of load operations in the set of load operations awaiting issue for execution; and
execution circuitry to execute the set of load operations;
the control circuitry being configured, in response to a detection from the count value of the data item associated with a given gather load instruction that the set of load operations generated for the given gather load instruction has reached a predetermined stage relative to execution of all of that set of load operations, the predetermined stage comprising a remaining number of the set of load operations, indicated by the count value, being less than or equal to a threshold number greater than zero, to control handling of a consumer instruction, being an instruction which depends upon the completion of the given gather load instruction.

2. Circuitry according to claim 1, comprising:
an instruction queue to store data defining decoded instructions awaiting execution; and
issue circuitry configured to initiate transfer of the consumer instruction to the execution circuitry;
the control circuitry comprising wake-up circuitry to initiate issue of the consumer instruction by the issue circuitry in response to the detection.

3. Circuitry according to claim 1, comprising arbitration circuitry to select a next load operation to be issued for execution.

4. Circuitry according to claim 3, in which the control circuitry is configured to update the count value to indicate a lower number of load operations in response to selection, by the arbitration circuitry, of one or more of the load operations.

5. Circuitry according to claim 4, in which the control circuitry is configured to update the count to indicate a higher number of load operations in response to failure of one or more load operations to complete execution.

6. Circuitry according to claim 5, in which, for a current arbitration cycle, the control circuitry is configured to indicate the count value applicable to a preceding arbitration cycle.

7. Circuitry according to claim 6, in which the predetermined stage comprises (i) the remaining number of the set of load operations, indicated by the count value, is less than or equal to a threshold number; and (ii) selection, by the arbitration circuitry in the current arbitration cycle, of all of the remaining number of the set of load operations.

8. Circuitry according to claim 7, in which the control circuitry is configured to cancel execution of the consumer instruction before completion of execution in response to failure of one or more of the set of load operations to complete execution.

9. Circuitry according to claim 7, in which:
the execution circuitry is configured to perform a number, n, of load operations in parallel; and
the threshold number is less than or equal to n.

10. Circuitry according to claim 1, in which each load operation for a given gather load instruction has an associated destination identifier defining a destination register common to the set of load operations for the given gather load instruction.

11. Circuitry according to claim 10, in which the control circuitry is configured:
to maintain a data item for each currently pending gather load instruction including the destination identifier;
to detect whether the destination identifier for a newly issued load operation corresponds to a destination identifier of an existing data item, and if not, to initiate generation of the a data item for a gather load instruction associated with that destination identifier.

12. Circuitry according to claim 10, in which:
the gather load instruction defines a target vector register having a plurality of entries to store data loaded in response to the gather load instruction;
the identifier for each load operation of the set of load operations generated for a gather load instruction indicates an entry in the target vector register; and
the execution circuitry is configured to transfer data loaded to the destination register in response to a given load operation to the respective entry in the target vector register defined by the identifier for the given load operation.

13. Circuitry according to claim 1, in which the gather load instruction has a scalar operand, in which the respective addresses from which data is to be loaded are defined by one of:
a base address defined by the scalar operand, modified by respective entries of the vector operand; or
a set of base addresses defined by the respective entries of the vector operand, each modified by the scalar operand.

14. Circuitry according to claim 1, in which the data item for a gather load instruction comprises one or more selected from the list consisting of:
an identifier of the gather load instruction which is unique with respect to other instructions decoded by the instruction decoder;
a data item validity indicator; and
an identifier common to the set of load operations for that gather load instruction.

15. Circuitry according to claim 1, in which the circuitry comprises an out-of-order processor configured to execute instructions of program code in an execution order independent of an instruction order within the program code.

16. A method comprising:
decoding a gather load instruction having a vector operand comprising a plurality of vector entries, in which each vector entry defines, at least in part, a respective address from which data is to be loaded;
the decoding step comprising generating a set of load operations relating to respective individual addresses in dependence upon the vector operand, each of the set of load operations having a respective identifier which is unique with respect to other load operations in the set, and maintaining a data item for the gather load instruction, the data item including a count value representing a number of load operations in the set of load operations awaiting issue for execution;

executing the set of load operations; and in response to a detection from the count value of the data item associated with a given gather load instruction that the set of load operations generated for the given gather load instruction has reached a predetermined stage relative to execution of all of that set of load operations, the predetermined stage comprising a remaining number of the set of load operations, indicated by the count value, being less than or equal to a threshold number greater than zero, controlling handling of a consumer instruction, being an instruction which depends upon the completion of the given gather load instruction.

17. Circuitry comprising:

means for decoding a gather load instruction having a vector operand comprising a plurality of vector entries, in which each vector entry defines, at least in part, a respective address from which data is to be loaded;

the decoding means comprising means for generating a set of load operations relating to respective individual addresses in dependence upon the vector operand, each of the set of load operations having a respective identifier which is unique with respect to other load operations in the set, and means for maintaining a data item for the gather load instruction, the data item including a count value representing a number of load operations in the set of load operations awaiting issue for execution;

means for executing the set of load operations; and means, responsive to a detection from the count value of the data item associated with a given gather load instruction that the set of load operations generated for the given gather load instruction has reached a predetermined stage relative to execution of all of that set of load operations, the predetermined stage comprising a remaining number of the set of load operations, indicated by the count value, being less than or equal to a threshold number greater than zero, for controlling handling of a consumer instruction, being an instruction which depends upon the completion of the given gather load instruction.

* * * * *